United States Patent [19]

Cohen

[11] Patent Number: 4,468,541
[45] Date of Patent: Aug. 28, 1984

[54] TERMINAL EQUIPMENT RING/DING SUPPRESSION CIRCUIT

[75] Inventor: Sam G. Cohen, Pleasantville, N.Y.

[73] Assignee: Timex Corporation, Waterbury, Conn.

[21] Appl. No.: 515,746

[22] Filed: Jul. 21, 1983

[51] Int. Cl.³ .............................................. H04M 3/38
[52] U.S. Cl. .................................. 179/84 C; 179/81 R
[58] Field of Search ...................... 179/81 R, 84 C, 88, 179/84 R, 84 A, 99 H, 5.5, 99 E, 18 AB, 18 DA, 6.16

[56] References Cited

U.S. PATENT DOCUMENTS 3,936,617 2/1976 Bolgiano ........................... 179/84 R
4,001,708 1/1977 Bolgiano ........................... 330/278
4,006,316 2/1977 Bolgiano ........................... 179/84 R Primary Examiner—Gene Z. Rubinson
Assistant Examiner—James L. Dwyer
Attorney, Agent, or Firm—William C. Crutcher; Joseph A. Biela

[57] ABSTRACT

A telephone subscriber's terminal equipment, which is part of a telecommunications network, is disclosed which includes ring suppress circuitry that prevents a ringing signal, which indicates the presence of an incoming call, from dinging the bell in the terminal equipment until the calling party is identified. The ring suppress circuitry also permits required loop current through the subscriber's terminal equipment to provide subscriber billing protection for the telephone company. The terminal equipment includes a microprocessor that detects the ringing signal and activates a relay in the ring suppress circuitry to prevent the terminal bell from dinging. Suppression of the ding is attributable to two back-to-back zener diodes connected in series with the relay contact and between the tip and ring conductors of the terminal equipment.

15 Claims, 7 Drawing Figures

TERMINAL EQUIPMENT RING/DING SUPPRESSION CIRCUIT

BACKGROUND OF THE INVENTION

This invention relates to an attachment for a telephone subscriber's terminal equipment and, in particular, to an attachment that completely suppresses the ring of the bell in the terminal equipment, which otherwise would occur in response to an incoming call, until the calling party is identified.

U.S. Pat. No. 3,936,617 issued to Bolgiano, discloses a system for selectively deactivating a telephone bell on a telephone instrument such that when a telephone number is called, an auxilliary system automatically cuts in to prevent ringing of the bell until a predetermined code is initiated, i.e. until the caller is identified, by the calling station. The telephone bell is actuated only when the caller is identified. The system includes a relay which operates to disconnect the phone instrument from the phone line, thereby theoretically preventing the bell in the instrument from operating (ringing). A flip-flop is used to open the bell ringer circuit causing a transistor to saturate so that the normally closed relay will open. However, due to inherent delays in switching when a ringing signal is first detected, the bell may actually ding when the normally closed relay opens. Furthermore, the open circuit produced by the opening of the relay does not satisfy the electrical current requirements for billing protection as explained in Section 68.314 (c) of the Federal Communications Commission (FCC) Rules and Regulations which are incorporated herein by reference. Section 68.314 (c) says that, for subscriber billing purposes, loop current through the subscriber's terminal equipment in the off-hook state, i.e. when answering an incoming call:

(1) must be at least as great as the current through a 200 ohm resistance connected across tip and ring conductors in place of the terminal equipment, or (2) must not decrease by more than 25 percent from its maximum value during at least a five (5) second interval immediately following the beginning of the off-hook state. Simply opening the relay in response to an incoming call does not satisfy the requirements of Section 68.314 (c) nor does it prevent the bell from dinging thereby alerting the subscriber to an incoming call before the calling party is identified.

Other relevant U.S. patents include U.S. Pat. Nos. 4,001,708 and 4,006,316 both issued to Bolgiano. Other references include the Bell System Communications Technical Reference, Pub. 47001, August 1976, and the FCC's, Part 68 Interconnection Standard 50-769-02, July 6, 1981.

Therefore, it is an object of this invention to completely suppress the dinging of the telephone bell when an incoming call is received and detected by a subscriber's terminal equipment until the calling party is identified.

An object of this invention is to completely suppress the dinging of the subscriber's telephone bell while at the same time permitting required loop current to flow through the subscriber's terminal equipment to provide for subscriber billing protection.

Normally, a telephone company central office applies negative battery to the ring conductor and ground to the tip conductor in a subscriber's terminal equipment. However, during the progress of an incoming call, the polarity of the calling station or called party line may be reversed depending on the type of call and type of switching system, i.e. step-by-step, in the central office.

Therefore, another object of the invention is to provide complete bell suppression regardless of whether the telephone company central office battery polarity is reversed.

SUMMARY OF THE INVENTION

In terminal equipment of the type having a ring and tip wires from a telephone company central office connected to a terminal bell and adapted to receive a ringing signal that rings the terminal bell to indicate the presence of an incoming call to the terminal equipment, the present invention provides a ringing signal detector in the terminal equipment that is connected across the ring and tip wires and that responds to the ringing signal for detecting an incoming call for providing control signals; a relay mechanism that is connected to the ringing signal detector and that responds to the control signals from the ringing signal detector; ring suppress circuitry that includes back-to-back zener diodes which are connected to the relay mechanism and across the ring and tip wires and which is controlled by the relay mechanism in order to completely prevent the terminal bell from ringing when a ringing signal is detected; and, line holding circuitry that includes an impedance connected to the relay mechanism and across the ring and tip wires and which is controlled by the relay mechanism in order to answer the incoming call to the terminal equipment.

DESCRIPTION OF THE PREFERRED EMBODIMENT

Figure 1:
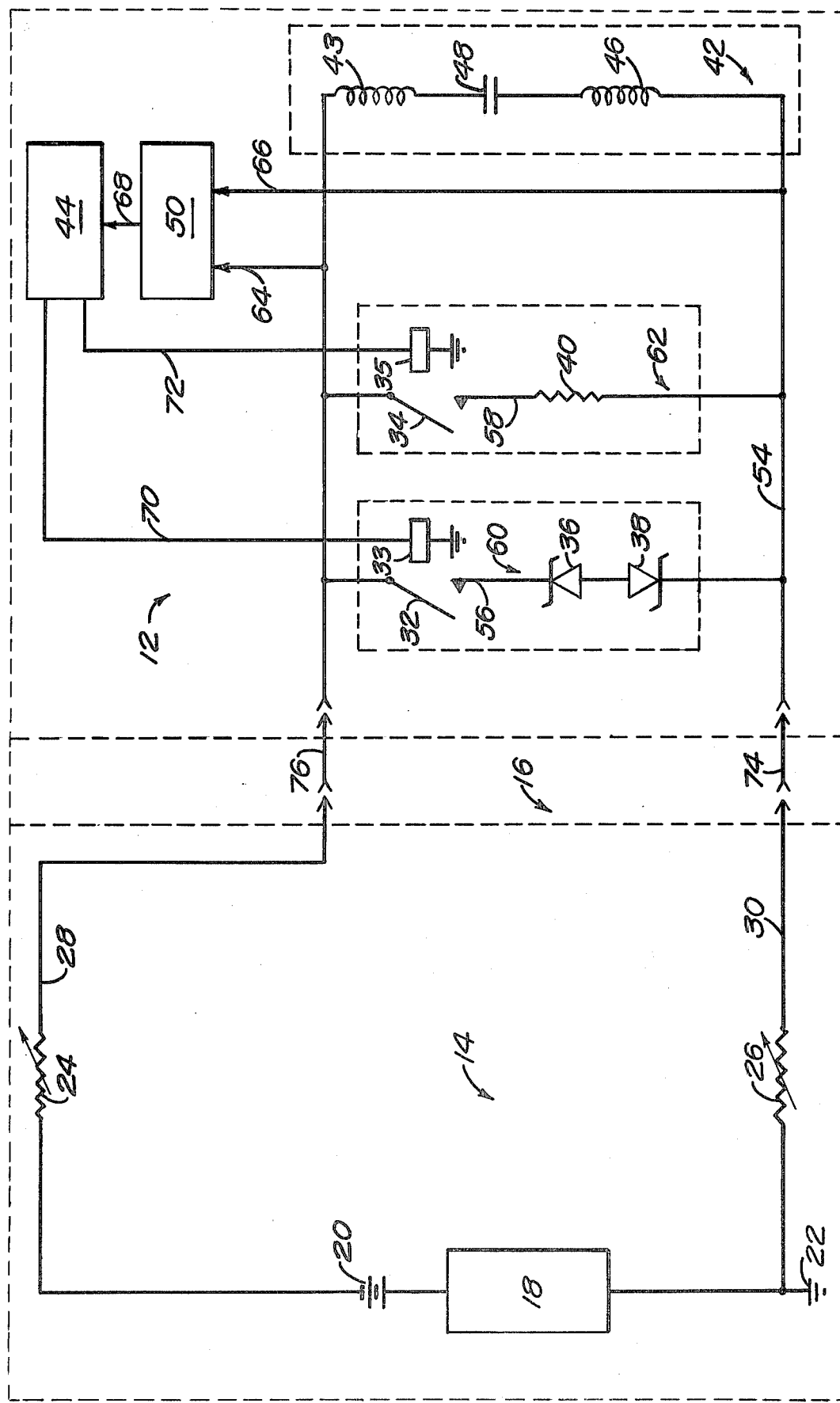
FIG. 1 is a schematic view of a telecommunications network which includes an embodiment of the present invention.

The invention disclosed herein can best be described in relation to a type of telephone service provided by a telephone company from its central office equipment to a subscriber's terminal equipment. Generally, a telephone company will provide a subscriber with one of two types of services, loop start and ground start. Loop start connections are typically used to provide two-way voice service. They can also be used for manual or automatic data service. Ground start connections are typically used for automatically originated data service. Since ground start lines are often used rather than loop start lines, only the ground start method, as shown in FIG. 1 and, equivalently, in FIG. 7, will be included in the discussion that follows. However, it is understood that the invention can be implemented with loop start connections to a subscriber's terminal equipment.

Referring to FIG. 1 telecommunications network 10 is shown which includes, in pertinent part, subscriber's terminal equipment 12, telephone company central office equipment 14 and network interface 16 electrically linking the central office equipment and the terminal equipment.

The subscriber's terminal equipment as shown in FIG. 1 is capable of receiving a signal from the telephone company indicating the presence of an incoming call to the subscriber's terminal without first ringing the subscriber's local terminal bell. The terminal equipment is also capable of interpreting additional signals (a code) transmitted from the calling party once the terminal is in the off-hook state in order to identify the calling party. Once the terminal equipment identifies the code, thereby identifying the calling party, it can perform one of several pre-programmed actions: ring the subscriber's local terminal bell in such a way that it identifies the calling party, produce a busy signal, produce a recorded message, etc. The invention disclosed herein will insure that the subscriber's bell will not ring (or make any sound) until the calling party is identified and yet still permit required loop current to flow through the subscriber's terminal equipment to provide for subscriber billing protection.

Telephone company central office equipment 14 includes ring generator 18, battery 20, ground 22, ring lead source resistance 24 and tip lead source resistance 26. Ring lead source resistance 24 represents the series resistance (500 ohms to 2500 ohms) from battery 20 to ring lead 28 in the central office equipment. Similarly, tip lead source resistance 26 represents the series resistance (0 ohms to 740 ohms) from ground 22 to tip lead 30 in the central office equipment. The tip lead is connected to ground 22.

Terminal equipment 12 includes ring wire 52 and tip wire 54 across which are electrically connected ring suppress circuitry 60, line holding circuitry 62, terminal bell 42, analog-to-digital (A/D) converter 50 and microprocessor 44. The terminal bell is represented by an equivalent series resonant circuit having first and second inductors, 43 and 46, and first capacitor 48. The ring suppress circuitry includes first relay contact 32, first relay controller 33, and back-to-back first and second zener diodes 36 and 38. The first relay contact and back-to-back zener diodes are electrically connected in series in first line 56 between the ring and tip wires. The line holding circuitry includes second relay contact 34, second relay controller 35 and resistor 40. The second relay contact and the resistor are electrically connected in series in second line 58 between the ring and tip wires. The first relay controller controls the closing and opening of the first relay contact at predetermined times in response to control signals received along first control line 70 from microprocessor 44. The second relay controller controls the closing and opening of the second relay contact at predetermined times in response to control signals received along second control line 72 from microprocessor 44. The control of the relays is discussed below. First and second relays, 32 and 34, are shown in FIG. 1 as electromechanical relays such that first and second relay controllers can be solenoids or, generally, control windings separated from each relay contact spring by an air gap. The control windings carry control current provided by the microprocessor to activate the relays. General telephone relays or (glass-enclosed) reed relays may be implemented as first and second relays 32 and 34 in a manner known in the art. Furthermore, solid state (electronic) relays generally used in certain communications switching functions may be implemented in place of the relays in FIG. 1 also in a manner known in the art. Such solid state relays include MOS or D field effect transistor switches or the equivalent which are known in the art.

As indicated above, analog-to-digital converter 50 is also connected across the ring and tip wires of the terminal equipment and is used to transmit digitized analog (ringing) signals to microprocessor 44 in a manner known in the art. The A/D converter is electrically connected to the tip wire by line 66 and to the ring wire by line 64. The microprocessor is electrically connected to the A/D converter by line 68. As a result of the execution of a software algorithm in response to digital signals received from the A/D converter, the microprocessor provides control signals (as represented by first and second control lines 70 and 72) to close first relay contact 32 and second relay contact 34, respectively, in a manner known in the art. The closing of the relays at appropriate times will be discussed more fully below. The A/D converter and the microprocessor are hereinafter referred to as the ringing signal detector means.

Network interface 16 includes tip and ring lines, 74 and 76, which electrically connect tip and ring leads, 30 and 28, in the telephone company central office to tip and ring wires, 54 and 52, in the subscriber's terminal equipment either directly or through intermediate circuits (not shown). The ring and tip wires, leads and lines are hereinafter collectively referred to as ring and tip conductors.

Figure 2:
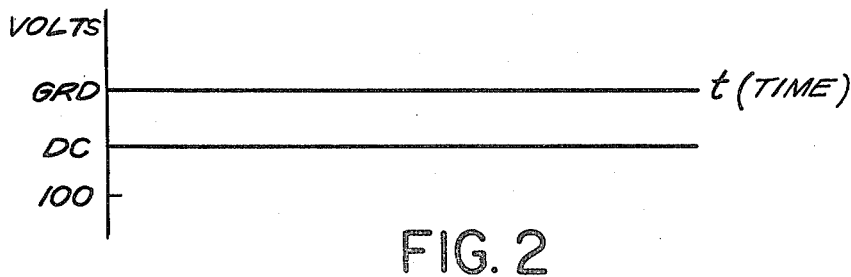
FIGS. 2-5 are electrical signal waveforms produced in the network shown in FIG. 1.

In the idle state, i.e. in the absence of an incoming call to terminal equipment 12, the potential at ground 22 is provided to the tip conductor and DC voltage, produced by battery 20, is provided to the ring conductor. The DC battery voltage will generally be within the range of from approximately 42 volts to approximately 57 volts. The battery voltage (DC), as shown in FIG. 2, which is selected as 50 volts, is negative with respect to ground (GRD).

In certain areas, central offices may provide a reversal of tip and ring polarity to indicate, for example, that a toll call has been dialed. In step-by-step central offices, a battery reversal is transmitted during the interdigital interval following the first, second, or third dial pulse digit. Such a reversal persists until the end of the call. In other words, the battery voltage, as shown in FIG. 2, may be positive with respect to ground. It is understood that the following description of the invention is applicable regardless of the reversal of ring and tip polarity.

Figure 3:
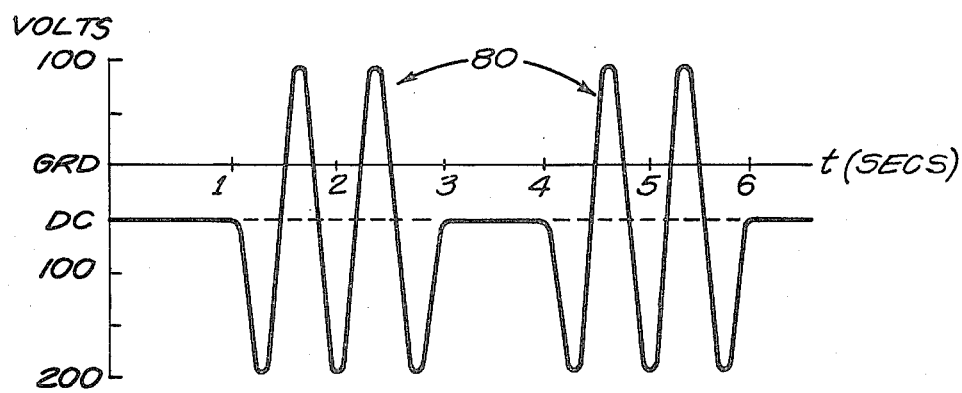

Ringing signals applied to the subscriber's terminal equipment by the central office equipment indicate the presence of an incoming call to the subscriber's terminal equipment. Alerting signals activate ring generator 18 in the central office which produces repetitive bursts of ringing signals 80 as shown in FIG. 3. The characteristics of the ringing signals will vary depending upon the type of telecommunications service provided, i.e. class A or class B service. Nevertheless, ringing signals can be characterized as AC voltage signals that usually vary from approximately 40 volts rms to approximately 150 volts rms. Ringing signals have a DC voltage component to enable the tripping of ringing. In this embodiment, as shown in FIG. 3, each repetitive ringing signal or burst is approximately two (2) seconds in duration over a six (6) second interval. Although not apparent since FIG. 3 is not drawn to scale, the frequency of each repetitive ringing signal in this embodiment is approximately 20 Hertz. In no case will the frequency of each burst exceed 70 Hertz.

Ringing signals are generally applied to the ring conductor with ground (0 volts) on the tip conductor. This is shown in FIG. 1 where ringing signals are applied to ring lead 28 in the central office. Ringing signals 80, as shown in FIG. 3, are produced by ring generator 18 and the ringing signal's DC voltage component is produced by battery 20. The ringing signals are transmitted along the ring conductor, i.e. ring lead 28, ring line 76 and ring wire 52, to A/D converter 50 via line 64. The AC voltage ringing signals are converted by the A/D converter to digital representations of the ringing signals in a manner known in the art. These digital representations (digital signals) are received by microprocessor 44 via line 68 to be used as data by the software program executed therein. The program includes software algorithms that are used to determine when a ringing signal is present. The two programmed conditions for determining when a ringing signal is present are as follows:
 (1) the ringing signal becomes greater than 35 volts with respect to the DC voltage component in the direction of polarity of the DC battery voltage, or
 (2) the ringing signal reverses polarity and reaches a magnitude of at least 10 volts.

These conditions account for the fact that the ringing signal can be transmitted on the ring conductor starting at substantially any point on the signal's sinusoidal waveform.

When the microprocessor determines, based on the above conditions, that a ringing signal is present, it transmits control signals on first and second dotted control lines, 70 and 72, in order to close first and second relays (relay means), 32 and 34, respectively. Closing second relay 34 is an indication that the subscriber's terminal equipment 12 has answered an incoming ringing signal by making the transition from the on-hook state to the off-hook state. Resistor 40, through which current flows when relay 34 is closed, essentially defines the terminal equipment impedance (resistance) in the off-hook state. The result is that the calling party continues to be connected to the subscriber's terminal equipment until the calling party is identified as indicated above. Closing first relay 32 theoretically totally suppresses the ringing of terminal bell 42 by "shorting it out" as shown in FIG. 4.

Figure 4:
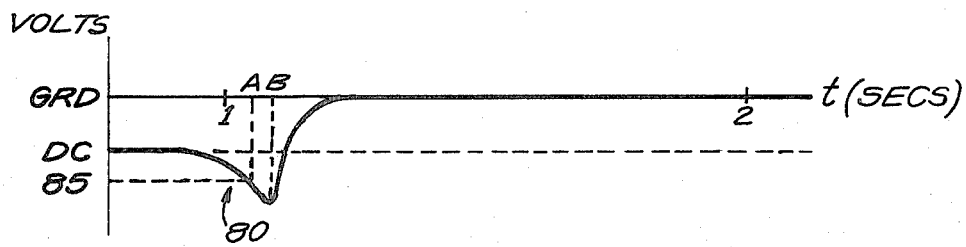
Figure 5:
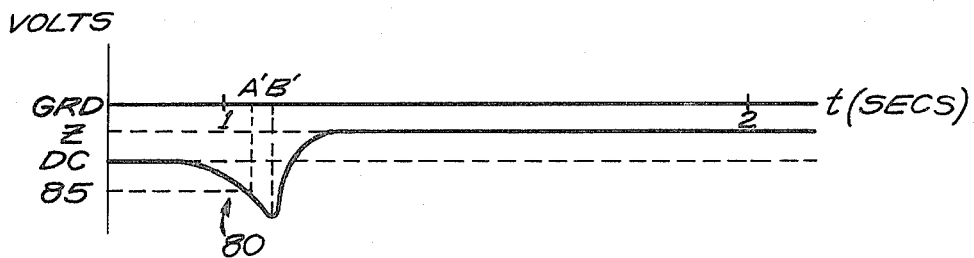

FIG. 4 shows an AC voltage signal that represents a portion of a ringing signal. (It is understood that the ringing signal can begin at substantially any point on its waveform and that the ringing signal can be superimposed on a positive DC voltage signal rather than a negative DC voltage signal as shown in FIGS. 3, 4, and 5.) When the AC voltage signal of FIG. 4 becomes greater than 85 volts in the negative direction, the microprocessor determines that a ringing signal is present and closes first relay contact 32 thereby producing an electrical "short circuit" (assuming that only relay 32 is in line 56) between ring wire 52 and tip wire 54 (ground). However, due to inherent switching delays in the terminal equipment, the first relay is not closed instantaneously once a ringing signal is detected. From the time that a ringing signal is detected at time A to the time when first relay closes at time B, in FIG. 4, the ringing signal develops sufficient magnitude to, at least partially, charge capacitor 48 in equivalent terminal bell circuit 42. As a result, the closing of relay 32 at time B has the effect of discharging capacitor 48 (the terminal bell) causing the bell to ding. This is undesirable since the subscriber's terminal equipment should not alert the subscriber to an incoming call until the calling party is identified as explained above. The extent of the ding is dependent upon the point in the ringing signal waveform when first relay 32 is closed producing a "short circuit." Generally, however, the terminal bell won't ding for momentary ringing signal bursts, less than a 40 volt rms signal, at between 15 or 68 Hertz, appears on the ring conductor.

In order to suppress completely the ding of terminal bell 42 when relay 32 is closed and to provide required loop current in the terminal equipment for subscriber billing purposes, first and second back-to-back zener diodes, 36 and 38, are placed in series with first relay 32 in line 56 between the ring and tip conductors. The back-to-back zener diodes act as "balanced clippers" and maintain the amplitude (magnitude) of the voltage between ring and tip wires, 52 and 54, substantially constant when relay 32 is closed. In other words, when a ringing signal is detected by microprocessor 44 and the microprocessor provides a control signal on first control line 70 for closing relay 32, a substantially constant voltage is obtained across back-to-back zener diodes 36 and 38 between ring and tip wires 52 and 54. The drop in voltage from a point on the AC voltage (ringing signal) to the back-to-back zener diode voltage is less than would otherwise occur if the closing of relay 32 created a short circuit between ring and tip wires, 52 and 54. By implementing the back-to-back zener diodes, in the manner described above, the terminal bell is prevented from dinging when relay 32 is closed in response to the detection of ringing signal 80 by microprocessor 44. In other words, the discharge of the partially charged capacitor 48 upon the closing of first relay 32 would not be sufficient to induce the terminal bell to ding due to the back-to-back zener diode voltage. The onset of ringing signal 80, the detection of a ringing signal (point A') and subsequent closing of first relay 32 (point B') and the drop to back-to-back zener diode-produced voltage Z are shown in FIG. 5. The zener diodes prevent a "short circuit" when relay 32 closes between tip and ring wires in the terminal equipment permitting sufficient current to flow through line 58 to provide subscriber billing protection as discussed above. The current required for billing purposes is provided through resistor 40 due to the back-to-back zener diodes voltage Z since relay 34 closes slightly later than the time that relay 32 closes.

Figure 6:
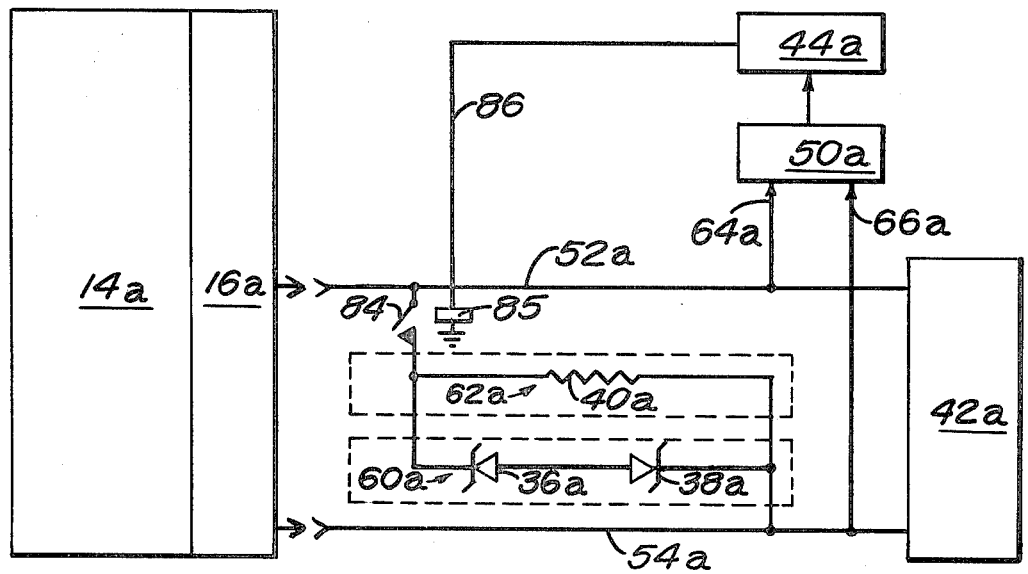
FIG. 6 is a schematic view of a telecommunications network which includes another embodiment of the present invention.

Another embodiment is shown in FIG. 6 which is implemented for the reasons provided above for the embodiment shown in FIG. 1. The significant structural difference is that only one relay, third relay 84, is used both for ring suppress circuitry 60a and line holding circuitry 62a. The third relay is electrically connected in series to the ring suppress and line holding circuitry. The ring suppress circuitry includes back-to-back zener diodes, 36a and 38a, and the line holding circuitry includes resistor 40a. The ring suppress circuitry and line holding circuitry are electrically connected between ring and tip wires, 52a and 54a. A/D converter 50a is electrically connected across the ring and tip wires via lines 64a and 66a and microprocessor 44a is electrically connected to the A/D converter via line 68a. The microprocessor provides control signals along control line 86 to third relay controller 85 for closing third relay 84 when a ringing signal is detected. The ring and tip wires are electrically connected on one end to terminal bell 42a and on the opposite end to central office equipment 14a and network interface 16a. The microprocessor and A/D converter of this embodiment are also hereinafter referred to as ringing signal detector means.

The back-to-back zener diode voltage for the embodiment shown in FIG. 1 is approximately 25 volts whereas the back-to-back zener diode voltage for the embodiment shown in FIG. 6 is approximately 35 volts. In both embodiments, a COPS 44L microcontroller commercially available from National Semiconductor Corp. was implemented as microprocessor 44 in FIG. 1 and as microprocessor 44a in FIG. 6. The microcontroller receives the output from the A/D converter in each case in order to detect when a ringing signal is present and accordingly transmits control signals for closing two relays in FIG. 1 or one relay in FIG. 6. Due to the back-to-back zener diodes in each embodiment, the terminal bell does not ding when the ring suppress relay is closed, i.e. either relay 32 or relay 84, and yet sufficient current flows through the line holding circuitry, controlled by the back-to-back zener diodes, to provide subscriber billing protection, as described above, since a short circuit is not produced between ring and tip conductors when the subscriber's terminal is placed in the off-hook state.

Figure 7:
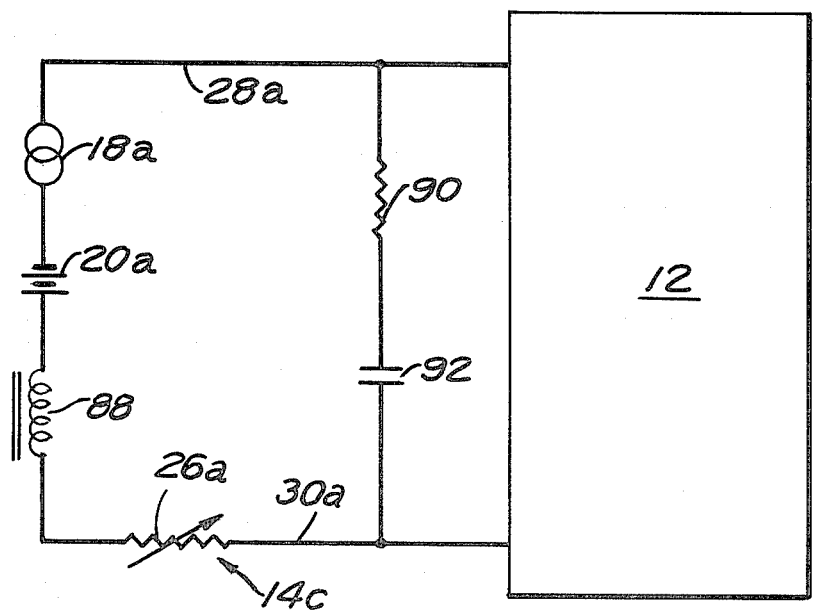
FIG. 7 is a schematic view of an equivalent circuit representation of the telecommunications network of FIG. 1.

Equivalent circuit 14c representing the central office line circuit (central office equipment 14 and 14a as shown in FIGS. 1 and 6 respectively) is shown in FIG. 7. Battery 20a provides the DC component of the AC ringing signal which is produced by ring generator 18a on ring lead 28a. Tip lead 30a is electrically connected to the central office protective circuitry represented by inductor 88. Variable resistor 26a represents the series resistance from ground to the tip lead in the telephone company central office and fourth resistor 90 and second capacitor 92 represent the AC impedance of the central office ringing trip circuit. The equivalent circuit is electrically connected to subscriber's terminal equipment 12 which includes the back-to-back zener diodes as described above. The equivalent circuit was implemented to test the invention disclosed herein in accordance with the current testing procedures for Federal Communications Commission Part 68, Interconnection Standard 50-769-02 which issued on July 6, 1981. Complete ring suppression is obtained regardless of whether the central office equivalent circuit battery polarity is reversed.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What is claimed is:

1. Terminal equipment of the type having ring and tip wires from a telephone company central office electrically connected to a terminal bell and adapted to receive a ringing signal for ringing said terminal bell to indicate the presence of an incoming call to said terminal equipment, wherein the terminal equipment comprises:

ringing signal detector means electrically connected across said ring and tip wires and responsive to said ringing signal for detecting said incoming call and adapted to provide control signals in response to said ringing signal, relay means electrically connected to said ringing signal detector means and responsive to said control signals received from said ringing signal detector means, ring suppress circuitry including back-to-back zener diodes electrically connected in circuit with said relay means across said ring and tip wires, said ring suppress circuitry controlled by said relay means for completely preventing the ringing of said terminal bell when said ringing signal is detected, and line holding circuitry including an impedance electrically connected in circuit with said relay means across said ring and tip wires, said line holding circuitry controlled by said relay means for answering said incoming call to said terminal equipment.

2. The terminal equipment of claim 1 in which said ring suppress circuitry and said line holding circuitry are controlled by the closing of said relay means in response to said control signals received from said ringing signal detector means.

3. The terminal equipment of claim 2 in which the closing of said relay means provides for said back-to-back zener diodes to produce a substantially constant voltage across said terminal equipment ring and tip wires, said back-to-back zener diodes providing a voltage drop between said ringing signal substantially constant voltage to completely prevent the ringing of said terminal bell when said ringing signal is detected.

4. The terminal equipment of claim 3 in which said closing of said relay means further produces the off-hook state of said terminal equipment wherein an electrical current flows through said impedance in said line holding circuitry, said impedance defining the terminal equipment resistance in the off-hook state.

5. The terminal equipment of claim 4 in which said current flow in said line holding circuitry is controlled by said substantially constant voltage produced by said back-to-back zener diodes to provide for billing protection.

6. The terminal equipment of claim 1 in which said ringing signal detector means includes a microprocessor.

7. The terminal equipment of claim 1 in which said ringing signal detector means includes an analog-to-digital converter.

8. The terminal equipment of claim 4 in which said relay means includes one relay in series with a parallel circuit of said zener diodes and said impedance.

9. The terminal equipment of claim 4 in which said relay means includes a first relay in series with said zener diodes and a second relay in series with said impedance.

10. The terminal equipment of claim 4 in which said relay means includes electromechanical or electronic relays.

11. The terminal equipment of claim 3 in which said tip wire is at ground potential.

12. The terminal equipment of claim 3 in which said ring wire is provided with a DC voltage of either polarity.

13. The terminal equipment of claim 3 in which said back-to-back zener diodes provide for a partial discharge of said terminal bell to prevent said terminal bell from ringing.

14. The terminal equipment of claim 3 in which said substantially constant voltage produced by said back-to-back zener diodes is approximately 25 volts.

15. The terminal equipment of claim 3 in which said substantially constant voltage produced by said back-to-back zener diode-produced voltage is approximately 35 volts.

* * * * *